(12) United States Patent
Passos et al.

(10) Patent No.: US 7,753,066 B2
(45) Date of Patent: Jul. 13, 2010

(54) SINGLE SYSTEM FOR LOW OR HIGH PRESSURE GASES CONTROL AND HIGH OR LOW PRESSURE GASES CONTROL VALVE

(75) Inventors: Ricardo Leite Passos, São Caetano de Sul/SP (BR); Alfredo José Alvim De Castro, Osasco/SP (BR); Caio Moldehnhauer Peret, São Bernardo do Campo/SP (BR); Eduardo Sala Polati, Embu/SP (BR); Heldai Lemos Ferreira, São Paulo/SP (BR); Sérgio Lopes Donke, São Paulo/SP (BR); Rodrigo Muzzutti, Santo André/SP (BR); Renato Giacomini, Santo André/SP (BR); Renato Gallina, São Paulo/SP (BR)

(73) Assignee: Thermojet do Brasil Ltda. (BR)

( * ) Notice: Subject to any disclaimer, the term of this patent is extended or adjusted under 35 U.S.C. 154(b) by 381 days.

(21) Appl. No.: 11/381,160

(22) Filed: May 2, 2006

(65) Prior Publication Data

US 2007/0256739 A1 Nov. 8, 2007

(51) Int. Cl.
*F16K 31/04* (2006.01)
*G05D 7/06* (2006.01)

(52) U.S. Cl. .................... 137/10; 251/118; 251/124; 137/487; 137/487.5

(58) Field of Classification Search ............... 137/485, 137/486, 487.5, 487, 10, 12; 251/118, 123, 251/124
See application file for complete search history.

(56) References Cited

U.S. PATENT DOCUMENTS

| | | | | |
|---|---|---|---|---|
| 2,719,704 A * | 10/1955 | Anderson et al. | ........... | 261/18.1 |
| 4,146,051 A * | 3/1979 | Sparks | ........... | 137/486 |
| 4,277,832 A * | 7/1981 | Wong | ........... | 700/282 |
| 4,512,548 A * | 4/1985 | Keller | ........... | 251/124 |
| 5,388,607 A * | 2/1995 | Ramaker et al. | ........... | 137/88 |
| 6,415,776 B1 * | 7/2002 | Gates et al. | ........... | 123/568.24 |
| 6,539,968 B1 * | 4/2003 | White et al. | ........... | 137/10 |
| 6,745,084 B2 * | 6/2004 | Boger et al. | ........... | 700/13 |

\* cited by examiner

*Primary Examiner*—Stephen Hepperle
*Assistant Examiner*—William McCalister
(74) *Attorney, Agent, or Firm*—McKee, Voohees & Sease, P.L.C.

(57) ABSTRACT

"SINGLE SYSTEM FOR CONTROL OF HIGH OR LOW PRESSURE GASES FLOW RATE AND VALVE FOR CONTROL OF HIGH OR LOW PRESSURE GASES", consists essentially in a system (S), which has active control of the movement of the valve (1) ram (P) solely by the concept of measurement of the flow rate and by the difference of pressure between the input and output of said valve (1), which, based on certain preconceived parameters, opens or closes the ram (P) so as to compensate the error between the actual and programmed flow rates.

5 Claims, 5 Drawing Sheets

SINGLE SYSTEM FOR LOW OR HIGH PRESSURE GASES CONTROL AND HIGH OR LOW PRESSURE GASES CONTROL VALVE

INTRODUCTION

This application for an Invention patent deals with an unprecedented "SINGLE SYSTEM FOR LOW OR HIGH PRESSURE GASES CONTROL AND HIGH OR LOW PRESSURE GASES CONTROL VALVE", especially a system capable of performing active control, regulation and measurement of the flow of gases in high or low pressure media through a single valve that incorporates its own and original characteristics, specifically geared to its application in any industrial sector or not, of transportation and measurement of gases within the productive process. In general terms, this system/valve differs in its conception, since it contemplates the concept of flow differential in the interior of a valve whose interpretation is used to open or close said valve, thus compensating the "error" between the actual and programmed flow, in addition to being enabled by a single valve.

TECHNICAL SECTOR AND INVENTION UTILIZATION

Traditionally, there are several applications for the supply of combustible or non-combustible gas, for example, the supply of combustible gas for the combustion system of burners and/or internal combustion engines.

Using the same inventive concept, the pleaded system/valve may be widely used, in the sectors listed below, among so many others:
   Control of exhaustion and internal pressure in industrial ovens;
   Industrial systems for transportation and measurement of gases within the productive process, as, for example, admission of gas as a reagent in large scale reactors; injection of nitrogen in the conformation of polymers by wind; powder drying by "spray drying", etc.;
   Compressed air systems;
   Medical-hospital equipment;
   Laboratory equipment.

BRIEF DESCRIPTION OF THE STATE OF THE ART

In general lines, the conventional systems for control, adjustment and measurement of gases use various specific valves to achieve an end, which is the supply of a controlled and adjusted gaseous flow for the user's needs, compensating the fluctuations inherent to gas or air supplies, in addition to valves strictly used to monitor said valves.

Conventionally, a complete system of valves for passage of gas or air through a line basically covers the following individual components:
   Pressure regulation valve(s), intended to stabilize incoming pressure;
   Pressure gauge(s) for measurement of the gas or air incoming and exit pressure;
   Temperature meters;
   Flow control valve(s), for stipulation of the flow of gas or air one wishes to operate with;
   Flow measuring valve(s) to serve as parameter(s) for the flow control valve(s);
   Safety valve(s) that guarantee shut-off of gas passage for pre-defined situations, such as, for example, the absence of flame in the burner or power supply failure.

In the conventional means, flow normalization as a result of temperature and pressure is performed subsequently, not being used for control itself.

In short, in said conventional media, individual adjustment and flow measurement mechanisms are used, also depending on extra pressure and temperature flow normalizing sensors (presentation of the flow equivalent to Normal Temperature and Pressure Conditions instead of the actual flow). This normalization is necessary for comparative purposes, as well as for the calculation, in the case of combustion systems, of calorific power according to the calorific power of gases, presented on the same normalization basis. Moreover, for safety purposes, the complete assembly still requires valves for this purpose, for example, valves of the solenoid type, which are normally closed, interconnected in series, to guarantee air tightness in the event of a breakdown or absence of flame, or emergency interruption of the flow according to any pre-defined condition.

PROBLEMS INHERENT TO SAID TECHNICAL SECTOR

The use of a system composed by individual valves for control, adjustment, measurement of flow and safety in supply of gas, especially fuel, is not an attractive cost x benefit solution due, as largely commented on, to the large number of components that make the system, at time, unstable due to the absence of one of these components, which must be submitted to constant preventive and even corrective maintenance. Therefore, in addition to the safety aspect, one has to consider the high cost involved in the operability of such systems, not only the acquisition and assembly costs but also the maintenance cost (preventive and/or corrective).

Flow control valves depend on the stability of line pressure, which has several sources of variation; hence, the need for the use of a pressure regulation valve at the intake, to guarantee that the flow control valve will operate with minimum interference of fluctuations.

The above-mentioned fluctuations may result from a series of factors. For the sake of illustration, one of the situations refers, for example, to a gas line, on which its speed generates great turbulence in the flow; consequently, the derivation of a secondary line with a smaller diameter to a burner will certainly lead to considerable fluctuation in the gas pressure and may cause instability in the resulting flow.

The currently available flow control valves are normally projected to operate at low fluid speed. In order to obtain this condition when a high flow rate is necessary, the required diameter for the piping and the valves becomes very large, involving more maintenance of the line and, of course, greater cost and safety are involved.

In addition, as already explained, the high complexity of the valve assembly involved produces an unstable and not very predictable gas flow.

PURPOSES OF THE INVENTION

Therefore, the Purpose of the invention is to propose a single system for control of the variables inherent to the air or gas flow at high or low pressure, among them, active flow control, regulation and measurement, including the safety system; using the concept of flow rate measurement by the difference of pressure between the input and output of the valve and its appropriate interpretation, which seeks to control or command the variable opening or closing of the valve so as to compensate the error between the actual flow rate, which suffers the interference of fluctuations and the programmed flow rate. For such, a valve is used to substitute the entire conventional model.

The valve in itself has its control tied to the proposed system, which has an active control of the movement of valve ram. Thus, an eventual increase in input pressure is compensated by the partial closure of the ram, keeping the flow rate constant. Moreover, within the limits of air tightness and mechanical resistance of the materials used in its manufacture, it is possible to work in quite ample ranges of input pressure, since the valve, as a result of the system pleaded, will answer with a greater or smaller opening depending on these conditions.

Basically the valve pleaded, commanded by the system proposed, regulates the air or gas flow rate, even under input pressure variation conditions. In short, it has the following peculiarities:

Maintain the flow rate at an adjusted level and within the desired precision profile, regardless of input pressure variations;

Measure the instantaneous flow rate;

Permit continuous adjustment of the flow rate whether at absolute levels, by means of a pre-defined flow rate curve as a function of the time, or by a temperature curve as a function of time (with the help of a temperature sensor located in an environment to be heated);

Guarantee airtight closure as a safety measure, in the event of failure in the supply of electric energy, absence of flame or any other pre-defined parameter.

MAIN ADVANTAGES OF THE INVENTION

Single system/valve for flow rate safety, measurement, control and regulation;
Active system regardless of pressure uniformity and input temperature;
Operation in any intensity of pressure, within an ample range of pressure in admission;
Valve portability;
Gas or air flow stability;
Reduced number of components involved;
Reduced maintenance;
Reduced risk;
High resolution;
Prompt response time;
Low cost;
Increase in the number of equipment units to be used, due to the possibility of use under high pressure.

BRIEF DESCRIPTION OF THE DRAWINGS

Hereinafter, the invention will be technically explained, using the drawings listed below as a basis, for illustration and not limitation, showing its main components.

Figure 1:
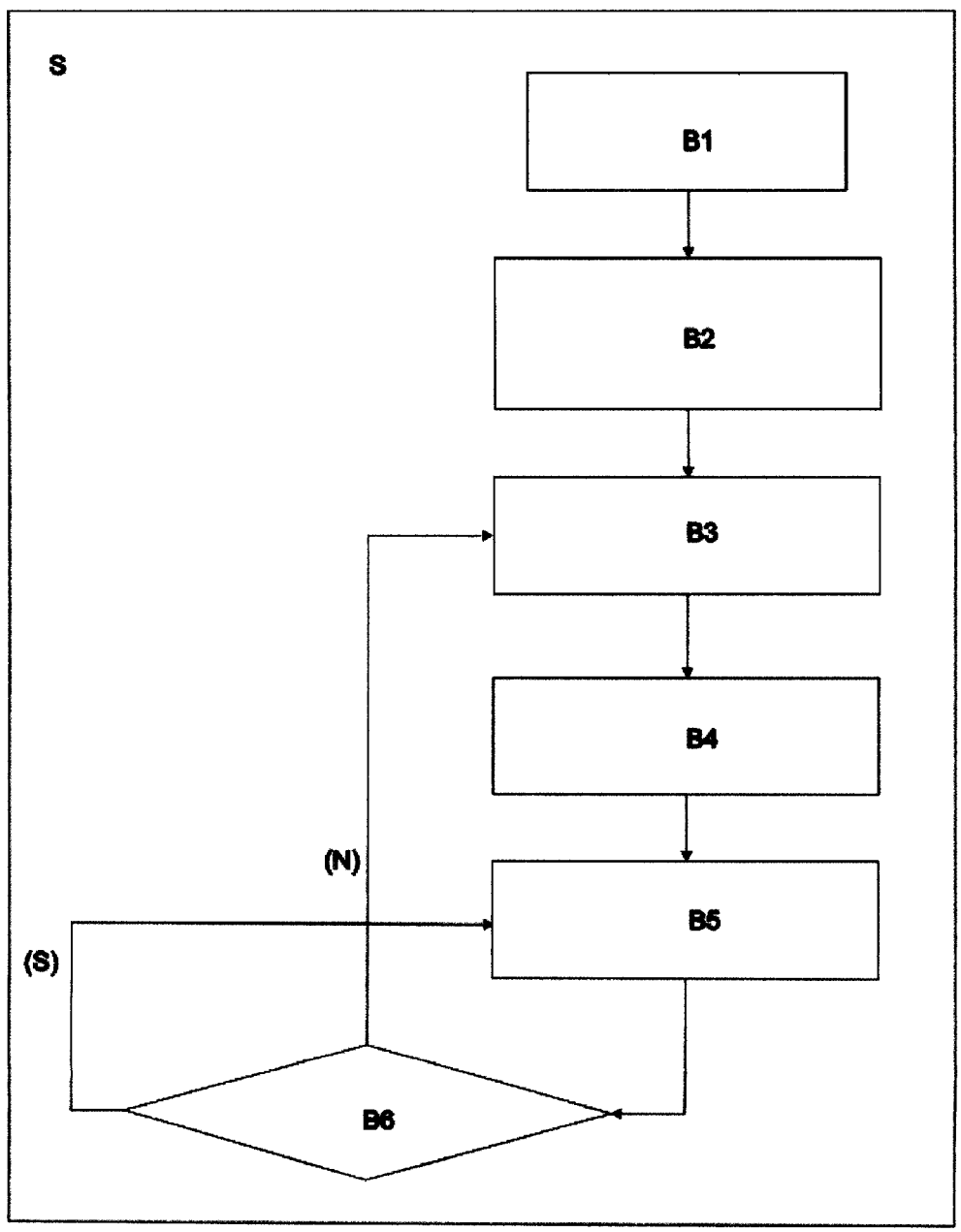
FIG. 1: Diagram in system blocks.
Figure 2:
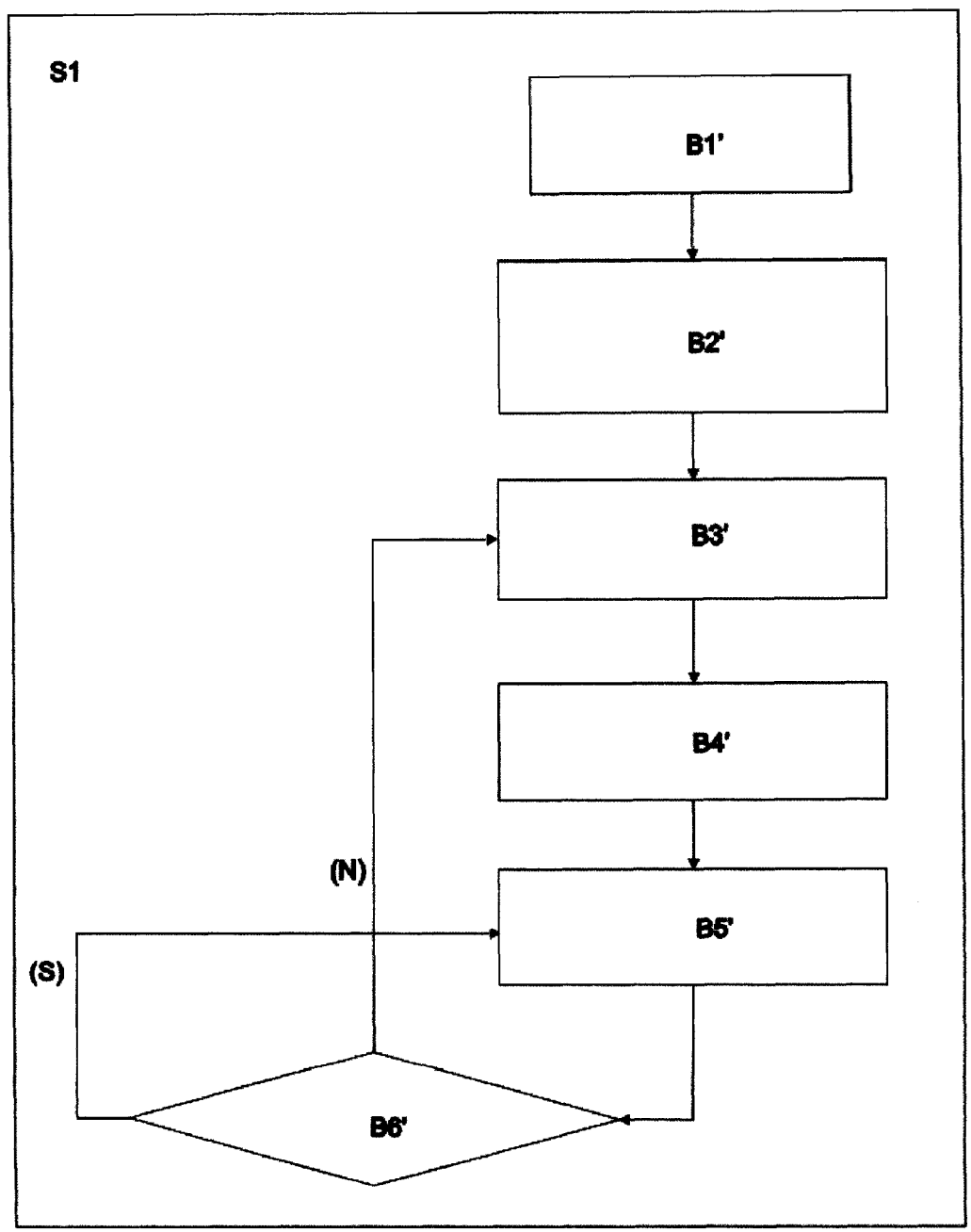
FIG. 2: Diagram in alternative system blocks.
Figure 3:
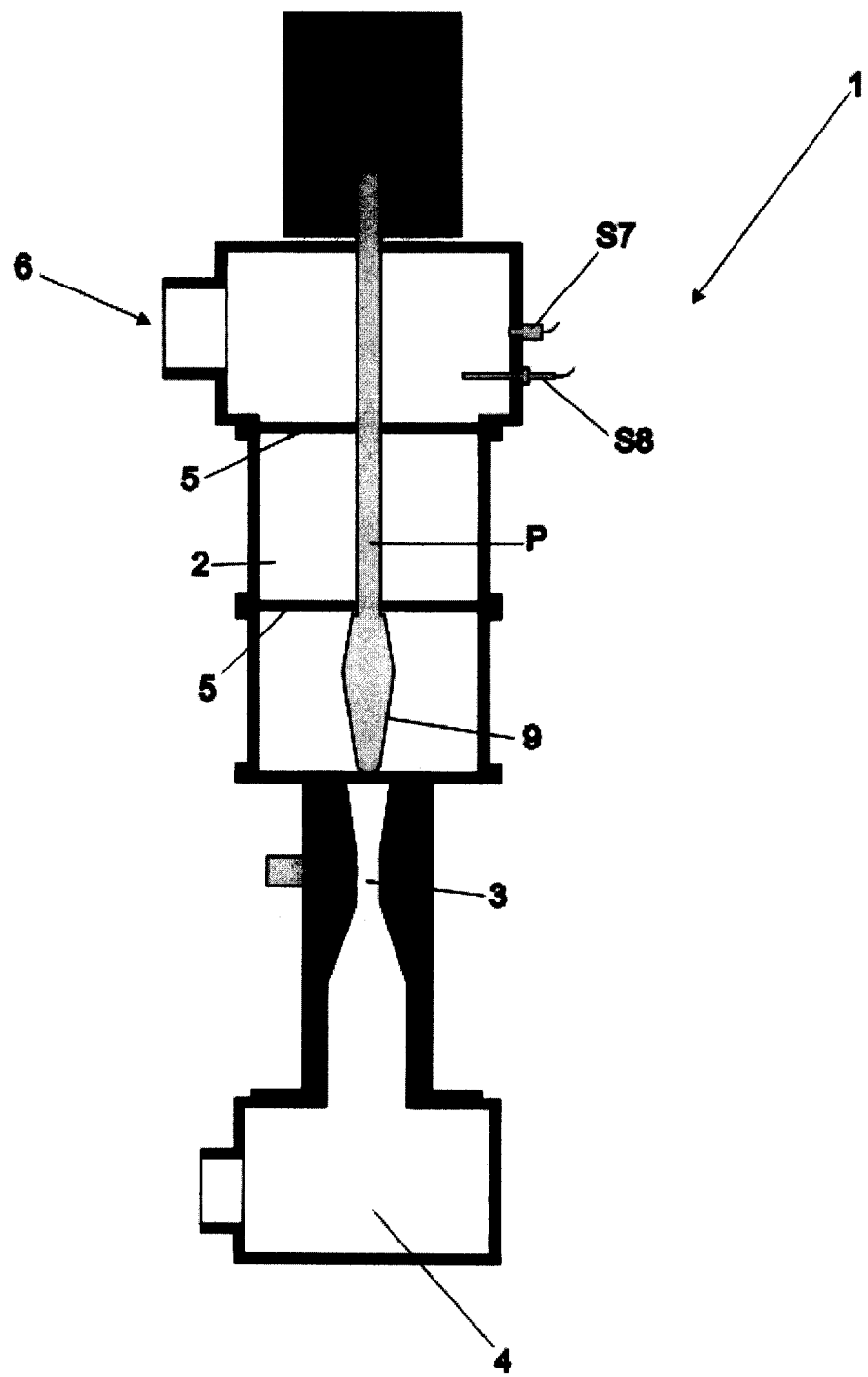
FIG. 3: View in cross-section cut of valve.
Figure 4:
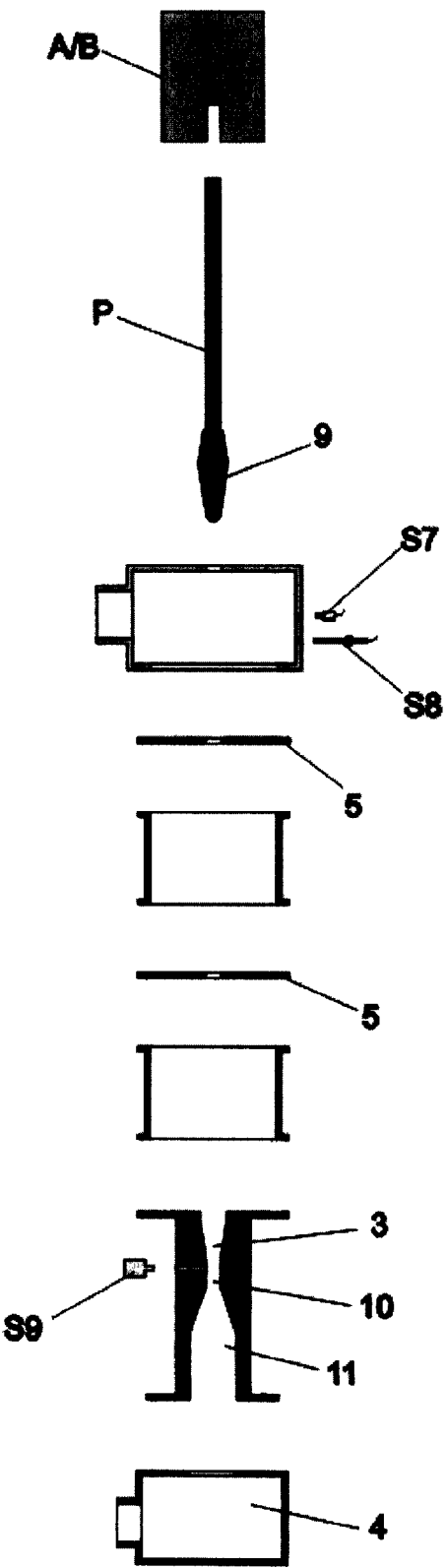
FIG. 4: View in exploded cut of valve.
Figure 5:
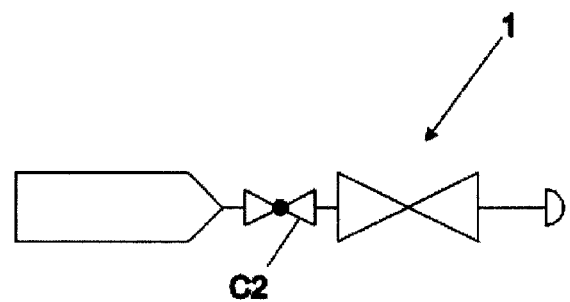
FIG. 5: Schematic flow chart of pleaded system.
Figure 6:
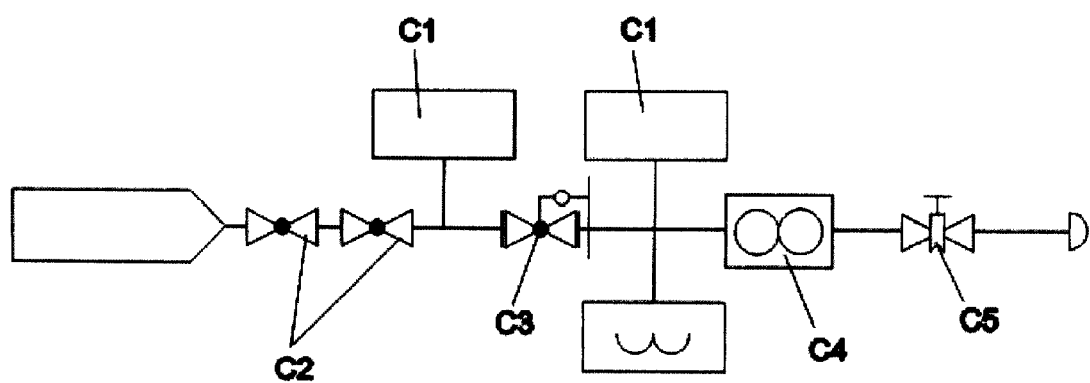
FIG. 6: Schematic flow chart of conventional system.

The "SINGLE SYSTEM FOR CONTROL OF HIGH OR LOW PRESSURE GAS AND CONTROL OF HIGH OR LOW PRESSURE GAS VALVE", contemplated in this Invention patent application, consists essentially in a system (S), which has active control of the movement of the single ram (P) valve (1), by the concept of measuring the flow rate and by the difference of pressure between the input and output of said valve (1), which, based on certain pre-conceived parameters, opens and closes the ram (P) so as to compensate the error between actual and programmed flow rates or the actual or programmed pressure differential.

More particularly, the system (S) proposed following some stages (B), to be described, substitutes the different measurement components (C1), solenoids (C2), pressure regulation valve (C3); flow meter (C4) and flow rate regulating valve (C5) in conventional modes, being capable of controlling the ram (P) of a valve (1), located after a solenoid valve (C2), which may be operated by a step engine (A) as well as by an electromagnetic mechanism (B), which, in a first stage (B1) reads the "set point" of the flow rate; at a second stage (B2) converts the "set point" of the flow rate into a "set point" of a pressure differential between the input and output of the valve; then to at a third stage (B3) reads the actual pressure differential; to then at a fourth stage, (B4) calculates the error between the actual pressure differential in relation to the differential of the "set point" pressure; at a fifth stage (B5) seeks the position contemplated in the valve ram (1); from a sixth stage (B6) analyzes the tolerance error and takes a decision; if the errors is smaller than the tolerance (N), it goes back to the third stage (B3); if the errors is greater than the tolerance (S), it goes back to the fifth stage (B5), i.e., seeks the estimated position of the ram (P).

Maintaining the same inventive concept, the system can occur by establishing a flow rate "set point" and by converting the pressure differential read in terms of the flow rate and subsequent comparison of the actual flow rate and flow rate "set point". Said system (S1) can be described specifically, at a first stage (B1') it performs the reading of the flow rate "set point"; at a second stage (B2') reads the actual pressure differential; then, at a third stage (B3') converts the actual pressure differential into actual flow rate; to then at a fourth stage (B4') calculates the error between the measured flow rate in relation to the flow rate "set point"; at a fifth stage (B5') seeks the position of the valve ram (1); from then on at a sixth stage (B6') analyzes the error in relation to the tolerance and takes a decision; if the error is smaller than the tolerance (N), it goes back to the third stage (B3'); if the error is greater than tolerance (S), it goes back to the fifth stage (B5'), i.e., seeks the estimated position of the ram (R).

More particularly, the valve (1) pleaded makes effective stages (B or B') above, for such, three main regions are formed; one gas admission chamber (2); one Venturi (3) and an output chamber (4).

The gas admission chamber (2) has, internally, a series of flow rate aligners, which are nothing more than drilled plates (5), which force the passage of the gas or air in the direction of alignment of the Venturi (3). The number and size of such plates (5) are appropriate to the capacity and format of the valve (1). With respect to the admission (6) of gas or air, it may be parallel (not represented) or orthogonal to the Venturi (3), but at this point, of input, there are sensors for measuring pressure (S7) and temperature (S8).

The Venturi (3) has a conical access (9) whose geometry matches valve (1), whose opening is regulated by an insert (10) of form and dimension coinciding with the Venturi (3), which may be activated by a step engine (A) or by an electromagnetic mechanism (B). After converging access (9) of the entrance of the Venturi, there is a passage (10) of reduced size, where the loss of the main cargo occurs, and, after this stretch a divergent output is projected (11), which configures the Venturi effect. In this output region (11) there is a second sensor (S9), intended to measure the pressure at this point.

After the Venturi (3), there may be an output chamber (4) for purposes of alignment of the flow or then, depending on the case, the output can be directly from the Venturi (3).

The operational intervention in the system/valve pleaded occurs by means of a specific panel (not represented), local or remote, whose dials shall enable instant visualization, the unit being automatically selected according to the type of gas and specific scale basis for each application, normalized or not as a function of pressure and temperature.

In the same valve (1), the control may be performed not only by the gas flow rate, but also by the environment temperature, sufficing to install a thermocouple next to the burner, this valve application being that which by an adequate interface would control the opening and/or closing of the ram (P) of the valve in response to the difference between the measure of the thermocouple and the projected heating curve.

Finally, for example, the heating of large size equipment, could lead to the installation of several thermocouples in its interior, whose duly worked data would serve as an entrance to simultaneous control systems of several valves, which would operate the variable opening and closing of valve rams, achieving, in this same centralized control system of the heating, according to the pre-defined heating curves.

The invention claimed is:

1. A method for controlling flow rate of a high or low pressure gas through a valve comprising the steps of:
   a. providing a valve having an input port, an output port, a valve ram controlling the flow rate of the high or low pressure gas through the valve, a gas admission chamber in communication with the input port, an output chamber in communication with the output port, and a Venturi between the gas admission and output chambers, the gas admission chamber having a series of flow aligners which force the passage of gas or air in the direction of the Venturi;
   b. reading a flow rate set point;
   c. converting the flow rate set point into a set point pressure differential between the valve input port and output port;
   d. reading an actual pressure differential;
   e. calculating an error between the actual pressure differential and the set point pressure differential;
   f. adjusting the position of the valve ram;
   g. analyzing an error in valve position in relation to a tolerance;
   wherein if the error in valve position is less than the tolerance returning to the step of reading the actual pressure differential and if the error in valve position is greater than the tolerance returning to the step of adjusting the position of the valve ram.

2. The method of claim 1 wherein the valve ram controls airflow through the Venturi.

3. The method of claim 1 wherein the valve further comprises a thermocouple.

4. The method of claim 3 further comprising the step of determining the difference between data measured by the thermocouple and a projected heating curve and controlling the flow rate of the valve based on this difference.

5. The method of claim 4 further comprising a plurality of thermocouples associated with a plurality of valves for providing a centralized heating control.

* * * * *